United States Patent [19]

Hanson

[11] 4,156,142

[45] May 22, 1979

[54] OPTICAL-MECHANICAL SCANNER MIRROR FOR AN INFRARED VIEWING SYSTEM

[75] Inventor: Charles M. Hanson, Springfield, Va.

[73] Assignee: The United States of America as represented by the Secretary of the Army, Washington, D.C.

[21] Appl. No.: 840,463

[22] Filed: Oct. 7, 1977

[51] Int. Cl.² ............................................. H01J 31/49
[52] U.S. Cl. ................................................. 250/334
[58] Field of Search ................................ 250/330, 334

[56] References Cited

U.S. PATENT DOCUMENTS 3,728,545  4/1973  Abel ........................................ 250/334

Primary Examiner—Davis L. Willis
Attorney, Agent, or Firm—Nathan Edelberg; Milton W. Lee; Max L. Harwell

[57] ABSTRACT

The invention comprises the closer positioning of a conventional telescopic lens, i.e., afocal lens, to a conventional optical scanner in such a combination as to minimize the required scanner mirror size and weight thereby improving scan efficiency, while also reducing physical size and thus the power requirement for driving the scanner mirror. The exit pupil of the telescopic lens is moved to a position close to the center of scanner wheel so that the incoming ray bundle follows the facets of the scanner mirror as it moves through a detector means field-of-view.

4 Claims, 9 Drawing Figures

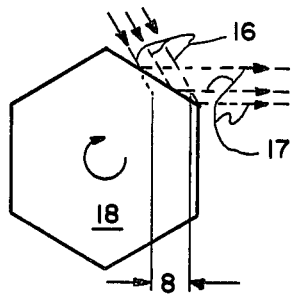
FIG. 1A
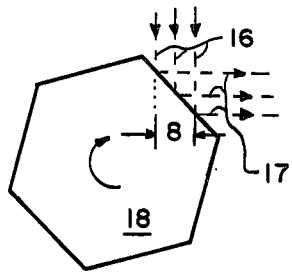
FIG. 1B
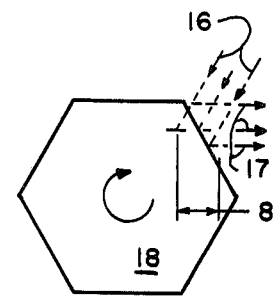
FIG. 1C
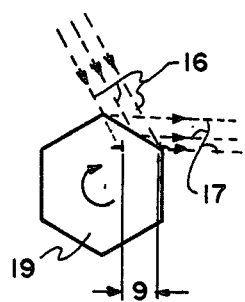
FIG. 2A
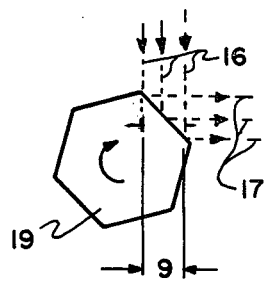
FIG. 2B
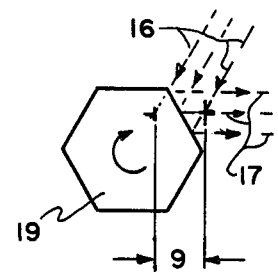
FIG. 2C
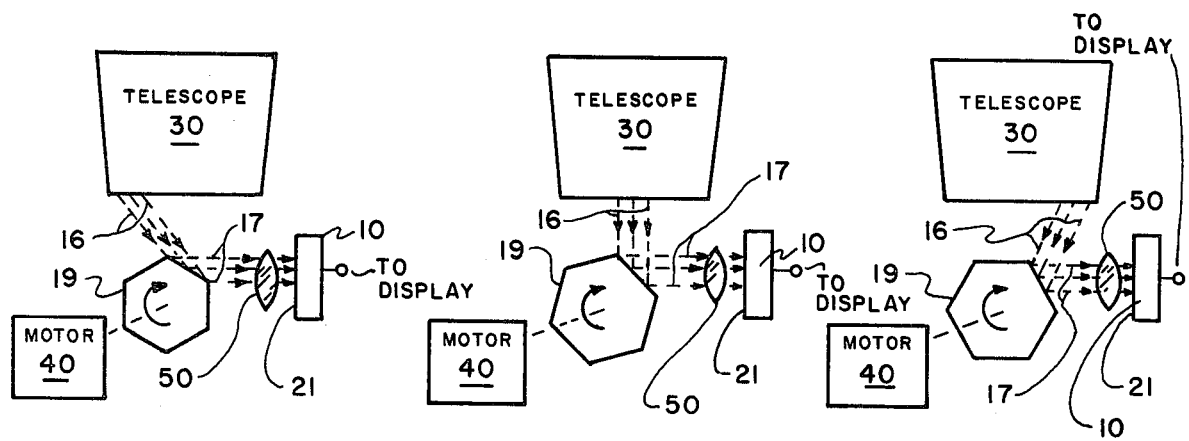
FIG. 3A
FIG. 3B
FIG. 3C

OPTICAL-MECHANICAL SCANNER MIRROR FOR AN INFRARED VIEWING SYSTEM

The invention described herein may be manufactured, used, and licensed by the U.S. Government for governmental purposes without the payment of any royalties thereon.

BACKGROUND OF THE INVENTION

The present invention is intended for use in infrared image viewing systems.

A typical infrared (IR) imager consists of an IR radiation image gathering device such as an IR telescope, an optical-mechanical scanner mirror, an IR collimator lens, and a detector means with processing electronics and a display means. The IR radiation, impinging on the IR telescope, is transmitted to the optical-mechanical scanner whereby the IR radiation is reflected off the facets of a multifaceted scanner and through the IR collimator and is focused on the detector means. The output signals from the detector means are amplified, processed, and displayed to an operator.

The exit pupil of the IR telescope is normally positioned at approximately the scanner mirror facet surface. As the scanner mirror rotates, the scanner mirror facets move with respect to the incoming bundle of radiation rays from the telescopic lens. Each facet must be large enough (or equivalently, the bundle of radiation small enough) so that no radiation misses the facet in any part of the field-of-view of the detectors.

SUMMARY OF THE INVENTION

In the present invention, an exterior reflective multifaceted optical-mechanical scanner mirror device is included in an IR imagining system used with a hand held or other type device where an optical detector is scanned across the field-of-view of the viewing telescope.

Specifically, the invention is comprised of a minimized exterior reflective multifaceted optical-mechanical scanner mirror that is so positioned with respect to an IR telescope radiation image gathering device that the exit pupil of a telescope radiation image gathering device having telescopic lens means, such as an afocal lens is moved to a point inside the scanner mirror which is near the center of the solid scanner wheel so that the incoming bundle of radiation impinges over the entire facet of each of the multifaceted optical-mechanical scanner mirrors as the bundle of radiation moves along with the scanner mirror facet. Thus a smaller scanner mirror is used with a given exit pupil. Advantages of the smaller scanner mirror are to reduce weight, volume, and power consumption. Scan efficiency is also increased at the same time. In some cases, the positioning of the scanner mirror with respect to the telescopic lens may permit 100% scan efficiency.

DESCRIPTION OF THE DRAWINGS

FIGS. 1A, 1B, and 1C are end view optical schematics of a conventional scanner mirror that is successively rotated through an angle equal to one half of the field-of-view;

FIGS. 2A, 2B, and 2C are end view optical schematics of the present minimized size scanner mirror which is also successively rotated through an angle equal to one half the field-of-view; and FIGS. 3A, 3B, and 3C show partial views of the telescope light beams projected from the telescope onto the present optical mechanical scanner mirror which is successively rotated through an angle equal to one half the field-of-view.

DESCRIPTION OF THE PREFERRED EMBODIMENT

FIGS. 1A, 1B, and 1C illustrate a typical conventional multifaceted scanner mirror 18 that is successively rotated through an angle equal to one half the field of view. A parallel beam, or incoming bundle of radiation 16, fills the exit pupil 8, shown at one facet surface of scanner mirror 18. The parallel bundle of radiation 16 is reflected off the facet of scanner mirror 18 into outgoing bundle of radiation 17 which goes to a detector means (not shown in those figures).

Look now at FIGS. 2A, 2B, and 2C, along with FIGS. 3A, 3B, and 3C. FIGS. 2A, 2B, and 2C illustrate, as an optical schematic in size comparison with the mirror 18 of FIGS. 1A, 1B, and 1C, the present reduced size multifaceted optical-mechanical scanner mirror 19. The incoming bundle of radiation 16 and outgoing bundle of radiation 17 are of the same width as that of FIGS. 1A, 1B, and 1C. The exit pupil is moved inside the scanner 19 to a position as indicated by number 9. The incoming bundle of radiation 16 moves along with each facet of scanner mirror 19, using the entire facet surface rather than only using a part of each facet as would be the case of the conventional scanner mirror 18. The incoming bundle of radiation 16 pivots about the exit pupil 9 of the telescope as the field-of-view is scanned. Therefore, if the exit pupil is positioned closer to the center of a scanner wheel, such as would be the case of scanner 19, the incoming bundle approximately follows the motion of the scanner facet as it moves to scan the field-of-view, rather than the facet moving past a stationary bundle. The scan efficiency is improved with the smaller scanner mirror 19. Also, with the reduced weight and volume of scanner mirror 19, the rotary drive motor 40 may be much smaller since the required power consumption to rotate scanner mirror 19 is somewhat less. A typical size, or power rating, for the motor 40 used to drive the present scanner mirror 19 is ½ watt. The power rating of motor 40 is determined in watts by the fourth power of the outermost diameter of scanner mirror 19.

FIGS. 3A, 3B, and 3C illustrate the overall IR imager viewing system. An IR radiation image gathering device, indicated as telescope 30, gathers an IR image which is passed through an internal afocal lens as a reduced parallel beam 16, or incoming bundle of radiation. A detector means is positioned within a detector/dewar 10 to sense only the outgoing bundle of radiation 17 which strikes a front surface 21 of the detector/dewar 10. Also within detector/dewar 10 are output processing electronics that may be connected to a display means. Thus the detector means senses only the parallel bundle of radiation 17 that is reflected off scanner mirror 19 and passes through collimator lens 50. The position of the field-of-view of the radiation imaging gathering device viewed by the detector means at any instant depends on the position of one of the facets of the multifaceted scanner mirror 19. As the scanner mirror 19 is rotated about its axis by motor 40, the complete field-of-view of device 30 is swept across the detector means in the sequence as shown in FIGS. 2A, 2B, and 2C and FIGS. 3A, 3B, and 3C. The multifaceted scanner mirror 19 may typically be selectively rotated by motor 40 at a range between 1,000 and 20,000 revolutions per minute.

The novelty of this invention is the combination of a conventional IR radiation image gathering device, such as an IR telescope, with a conventional rotary scanner mirror in such a manner that the bundle of radiation moves approximately with each facet of the scanner mirror 19 and provides an increased scan efficiency.

Even though only an embodiment showing the scanner mirror 19 as being smaller with the incoming parallel bundle of radiation 16 being the same beam width, other variations may be made of the invention described herein without departing from the spirit and scope of the appended claims.

I claim:

1. In combination with an IR imager viewing system having an optical-mechanical scanner wherein the combination comprises:
   an IR telescope radiation image gathering device having telescopic lens means for narrowing an incoming IR image and for providing a narrow parallel bundle of radiation from said IR telescope radiation image gathering device;
   a detector/dewar having therein detector means for sensing said parallel bundle of radiation and output processing electronics connected to a display means;
   a solid exterior reflective multifaceted optical-mechanical scanner mirror which is positioned with respect to said IR telescope radiation image gathering device in which the exit pupil of said telescopic lens means is moved to a position close to the center of said solid exterior reflective multifaceted optical-mechanical scanner mirror wherein said narrow parallel bundle of radiation impinges over the entire facet of each of the multifaceted optical-mechanical scanner mirrors as narrow parallel bundle of radiation moves along with each of the facets; and
   an IR collimator lens positioned between said solid exterior reflective multifaceted optical-mechanical scanner mirror and said detector means for collimating said narrow parallel bundle of radiation across said detector means.

2. The combination as set forth in claim 1 wherein said multifaceted optical-mechanical scanner is positioned with respect to said lens means and said detector means wherein said narrow bundle of radiation is linearly swept across said detector means.

3. The combination as set forth in claim 2 wherein said multifaceted optical-mechanical scanner is selectively rotated at a range between 1,000 and 20,000 revolutions per minute by a rotary drive motor.

4. The combination as set forth in claim 3 wherein said multifaceted optical-mechanical scanner is of a size that said narrow bundles of radiation impinges over each entire facet of said multifaceted optical-mechanical scanner.

* * * * *